(12) United States Patent
Herrera

(10) Patent No.: US 12,502,992 B2
(45) Date of Patent: Dec. 23, 2025

(54) SOLAR+STORAGE ELECTRIC VEHICLE CHARGING CARPORT

(71) Applicant: HATCHTANK LLC, Helotes, TX (US)

(72) Inventor: Matthis Herrera, Helotes, TX (US)

(73) Assignee: hatchTank LLC, Helotes, TX (US)

( * ) Notice: Subject to any disclaimer, the term of this patent is extended or adjusted under 35 U.S.C. 154(b) by 0 days.

(21) Appl. No.: 19/032,462

(22) Filed: Jan. 21, 2025

(65) Prior Publication Data

US 2025/0236194 A1 Jul. 24, 2025

Related U.S. Application Data

(60) Provisional application No. 63/623,287, filed on Jan. 21, 2024.

(51) Int. Cl.
| | |
|---|---|
| *B60L 53/51* | (2019.01) |
| *B60L 53/52* | (2019.01) |
| *H02S 10/12* | (2014.01) |
| *H02S 20/23* | (2014.01) |
| *H02S 20/30* | (2014.01) |

(52) U.S. Cl.
CPC ............ *B60L 53/51* (2019.02); *B60L 53/52* (2019.02); *H02S 10/12* (2014.12); *H02S 20/23* (2014.12); *H02S 20/30* (2014.12)

(58) Field of Classification Search
CPC ..................................................... B60L 53/51
USPC ........................................................ 320/101
See application file for complete search history.

(56) References Cited

U.S. PATENT DOCUMENTS

| | | | |
|---|---|---|---|
| 5,315,227 A | 5/1994 | Pierson et al. | |
| 11,448,191 B1* | 9/2022 | Graham | ............... F03D 3/002 |
| 11,912,144 B2 | 2/2024 | Wheatley | |
| 2009/0050194 A1 | 2/2009 | Noble et al. | |
| 2010/0200041 A1* | 8/2010 | Dearborn | ............... B60L 8/003 |
| | | | 136/244 |
| 2010/0225266 A1* | 9/2010 | Hartman | ............... B60L 53/60 |
| | | | 290/55 |
| 2010/0322770 A1* | 12/2010 | Sheinman | ............... F03D 3/061 |
| | | | 416/242 |
| 2011/0030285 A1* | 2/2011 | Kaufman | ............... E04H 6/025 |
| | | | 52/173.3 |
| 2011/0133689 A1* | 6/2011 | Uchihashi | ............... B60L 53/30 |
| | | | 320/101 |
| 2011/0187114 A1* | 8/2011 | Socolove | ............... F03D 9/00 |
| | | | 290/55 |
| 2011/0194277 A1* | 8/2011 | Yamaguchi | ............... H02J 9/00 |
| | | | 362/183 |
| 2011/0221203 A1 | 9/2011 | Miller | |
| (Continued) | | | |

*Primary Examiner* — Jerry D Robbins

(57) ABSTRACT

Solar+Storage Electric Vehicles (EV) Charging Carport (SSEVCC) is a prefabricated, ship-to-site, fully integrated, solar electric generator roof, energy storage system, power management system, EV charger carport designed to generate renewable electricity, store electricity, provide electricity for onsite EV charging, receive and provide electricity to/from Virtual Power Plants (VPP), Microgrids, and electric utility grids. The SSEVCC is designed to be a turnkey, with little additional onsite infrastructure required, deployment and rapid installation, solar plus energy storage EV charging carport for fleet parking and dispatch lots.

28 Claims, 8 Drawing Sheets

(56) References Cited

U.S. PATENT DOCUMENTS

| | | | |
|---|---|---|---|
| 2011/0265694 A1* | 11/2011 | Portis | H01M 10/465 320/101 |
| 2012/0007542 A1* | 1/2012 | Jammer | H01M 10/465 320/109 |
| 2012/0010894 A1* | 1/2012 | Jammer | G06Q 30/06 320/101 |
| 2012/0175879 A1* | 7/2012 | Keech | F03D 3/0418 290/55 |
| 2012/0300440 A1* | 11/2012 | Miyamae | H01M 10/6562 362/183 |
| 2013/0033222 A1* | 2/2013 | Hixson | E04H 1/1211 136/246 |
| 2013/0042542 A1* | 2/2013 | Welschholz | B60L 53/30 52/173.3 |
| 2013/0076294 A1* | 3/2013 | Smith | B60L 53/51 320/109 |
| 2013/0080254 A1* | 3/2013 | Thramann | B60L 53/68 705/14.57 |
| 2013/0118099 A1* | 5/2013 | Scanlon | F24S 25/636 136/246 |
| 2013/0119661 A1* | 5/2013 | Pringle | F03D 3/002 290/55 |
| 2013/0127395 A1* | 5/2013 | Santos Silva Serra Duarte | H02J 7/0013 320/101 |
| 2013/0229141 A1* | 9/2013 | Johnson | G06Q 10/06315 29/897.3 |
| 2014/0042956 A1* | 2/2014 | Wheatley | H02S 20/32 320/101 |
| 2014/0246903 A1* | 9/2014 | Romeo | E04H 6/025 307/11 |
| 2015/0113987 A1* | 4/2015 | Mackler | H02S 20/23 60/641.2 |
| 2015/0175024 A1* | 6/2015 | Bell | H02S 40/22 320/101 |
| 2015/0288317 A1* | 10/2015 | Huang | H02S 10/10 307/26 |
| 2015/0321569 A1* | 11/2015 | Muait Jardim | B60L 53/16 320/101 |
| 2015/0333565 A1* | 11/2015 | Korman | H02S 30/20 136/251 |
| 2015/0354244 A1* | 12/2015 | Fernández González | E04H 15/58 244/153 R |
| 2016/0141913 A1* | 5/2016 | Wheatley | H02J 7/0044 320/101 |
| 2016/0294022 A1* | 10/2016 | Thramann | B60L 50/64 |
| 2017/0106763 A1* | 4/2017 | Dow | B60L 53/37 |
| 2017/0129356 A1* | 5/2017 | Johnson | B60L 53/63 |
| 2017/0159306 A1* | 6/2017 | Maurus | B60L 53/68 |
| 2017/0318919 A1* | 11/2017 | Gharabegian | A45B 25/00 |
| 2017/0318921 A1* | 11/2017 | Gharabegian | F24S 30/452 |
| 2017/0318922 A1* | 11/2017 | Gharabegian | A45B 25/143 |
| 2018/0264955 A1* | 9/2018 | Gupta | G06Q 30/0283 |
| 2019/0260094 A1* | 8/2019 | Thramann | B60L 50/64 |
| 2019/0316729 A1* | 10/2019 | Gurr | F16M 11/10 |
| 2020/0036325 A1* | 1/2020 | Poivet | H02S 30/20 |
| 2020/0067449 A1* | 2/2020 | Corsi Henson | E04H 6/025 |
| 2020/0240166 A1* | 7/2020 | Graner | B60L 55/00 |
| 2020/0251960 A1* | 8/2020 | Sauchyn | H02K 11/05 |
| 2021/0050813 A1* | 2/2021 | Büchel | H02S 40/38 |
| 2021/0182919 A1* | 6/2021 | Wyckoff | H02J 7/0013 |
| 2021/0188105 A1* | 6/2021 | Wheatley | H02S 10/12 |
| 2021/0207577 A1* | 7/2021 | Rakoczi | F03D 9/25 |
| 2021/0313927 A1* | 10/2021 | Dunn | H02S 30/10 |
| 2021/0387538 A1* | 12/2021 | Wheatley | H02S 40/38 |
| 2022/0009361 A1* | 1/2022 | Suzuki | H02J 1/14 |
| 2022/0069767 A1* | 3/2022 | Graner | H10F 19/807 |
| 2022/0077513 A1* | 3/2022 | Thramann | B60L 55/00 |
| 2022/0118872 A1* | 4/2022 | Wheatley | H02S 30/20 |
| 2022/0182009 A1* | 6/2022 | Poivet | E04B 1/0046 |
| 2022/0219559 A1* | 7/2022 | Joisten-Pieritz | B60L 53/54 |
| 2022/0289054 A1* | 9/2022 | Palmer | B60L 53/30 |
| 2023/0081083 A1* | 3/2023 | Fisher | B60L 15/20 320/109 |
| 2023/0101396 A1* | 3/2023 | Kamalakar | B60L 53/51 320/109 |
| 2023/0158914 A1* | 5/2023 | Lin | H02J 7/35 320/101 |
| 2023/0208184 A1* | 6/2023 | Bahei-Eldin | H02J 3/14 320/109 |
| 2023/0208345 A1* | 6/2023 | McCalmont | H02J 7/35 |
| 2023/0339338 A1* | 10/2023 | Horvath | H02J 7/0042 |
| 2023/0339351 A1* | 10/2023 | Andreas | B60L 50/70 |
| 2024/0128921 A1* | 4/2024 | Hau | H02S 20/23 |
| 2024/0149725 A1 | 5/2024 | Wheatley | |
| 2024/0388120 A1* | 11/2024 | Hjelmaker | H02S 10/40 |
| 2024/0416779 A1* | 12/2024 | Boucher | H01M 10/46 |

\* cited by examiner

SOLAR+STORAGE ELECTRIC VEHICLE CHARGING CARPORT

CROSS-REFERENCE TO RELATED APPLICATIONS

This is a Non-Provisional U.S. Patent Application filed under 35 U.S.C. 111 (a). A priority claim is made to U.S. Provisional Patent Application No. 63/623,287, filed Jan. 21, 2024, which is incorporated in its entirety by reference.

FIELD OF THE INVENTION

The present invention pertains to the growing need for EV fleet charging infrastructure. Instead of waiting for and relying on sufficient upstream utility-scale electricity (production, transmission, and distribution) to be available (constructed), the SSEVCC provides localized, distributed, downstream autonomy solutions for the increasing EV fleet charging electricity demand. A widening electricity supply (production, transmission, distribution) and demand gap exist for reliable and economically viable renewable EV-charging electricity for fleet operators. To ease electricity supply-side strains from the outpacing demand-side growth of widespread vehicle electrification, electrification of other industries (residential and commercial building HVAC, industrial processes), and the increased strain that computational heavy industries such as artificial intelligence (AI) and cryptocurrency/blockchain, the SSEVECC is designed as an all-encompassing energy solution for EV fleets, EV parking and dispatch lot operators and the electric utilities that support them.

BACKGROUND OF THE INVENTION

Last-mile delivery vehicles, such as those used for local mail, package, freight, and parcel delivery services; local food and goods delivery services; local professional and trade service providers; utility, municipal, and government fleets; and taxi, ride-hailing, and driverless autonomous mobility on demand (AMoD) (aka robotaxi) services are transitioning from gasoline and diesel-powered vehicles to cleaner and more cost-effective EV alternatives. With these market-wide EV growths comes the growing need for EV fleet operator electricity supply technologies that can free fleet operators from our antiquated electric grids (electricity network), and relieve electric grid operators from the concentrated, localized pocket of high electricity demand that comes with EV fleet charging site operations at the grid's edge. Compounding the electricity demand issue is the impending grid strains caused by dozens of centralized EV fleet lots being operated within single electric distribution markets.

Without sufficient onsite EV charging electricity autonomy combined with intelligent and adaptive utility grid integration, which can only be achieved with parking/dispatch site generated and stored electricity, EV fleet growth and expansion are hindered by electric utility supply constraints (production, transmission, and distribution). Grid inadequacy caused by component, equipment, and workforce supply shortages, regulatory and bureaucratic barriers, and funding issues have left our grids unable to provide the amount of electricity our electrification transition demands. This has and will continue to significantly stunt fleet EV adoption and growth rates, limiting the location and number of EV fleet lots within geographical markets, holding EV fleet operators hostage to the price variability and uncertainty of how future electricity pricing markets will impact their business, and the high operational risks associated with utility provided electricity supply shortages and outages.

DESCRIPTION OF RELATED ART

One solution that can provide some onsite renewable energy charging benefits is conventional solar roofed carports. If done correctly, these onsite power-generating assets will take up little to no additional real estate, provide renewable electricity, and reduce some utility-provided electricity demand. But due to the intermittency, variability, and seasonality of solar production, they do not reduce utility-side infrastructure requirements because at any point in time when there is little to no solar generation (sunset to sunrise, cloudy and inclement weather, etc.) the grid will still have to be able to provide 100% of their fleet's charging needs. Thus, these conventional solar carport designs still require all upstream distribution, transmission, and production infrastructure requirements to meet 100% of the fleet's capacity needs. This means that conventional solar-roofed carports do not solve the fleet operators' autonomy needs and the operators' demand-supplying infrastructure issues.

These conventional solar carport designs are typically custom-designed and engineered for site- and customer-specific needs. Thus, these location-specific bespoke designs come with the cost and time premiums associated with per-project design, engineering, and onsite construction and assembly, which typically involve extensive site surveys, prep-, during, and post-instillation work like ground excavation and trenching, pouring concrete foundations, and running buried wire.

There are variants of these conventional solar carports that are standardized in an effort to reduce design and construction costs and time. Still, these solar carport structures, such as US20130127395A1 "solar station for charging electric vehicles system" and US20090050194A1 "support system for a photovoltaic system," lack the necessary integrated energy storage system(s) needed to ensure adequate low solar radiance days and overnight renewable electricity available for EV charging.

In contrast to conventional solar carports that do not have an enclosed building structure (a housing), there are portable building EV charging systems with solar roofs. As claimed in US20110221203A1 and U.S. Pat. No. 5,315,227A, these versions consist of an enclosure/housing. US20110221203A1 "portable enclosure made from structural insulated panels (SIPs), each of the SIPs having two structural skins of oriented strand board and a core of rigid foam plastic insulation sandwiched between the skins." U.S. Pat. No. 5,315,227A "housing means including at least an inside, an outside, at least two areas including a contact room and a separate charge room;" "said contact room having space for enclosing at least one electric powered vehicle." Having an integrated enclosed building/housing takes up additional valuable commercial real estate and reduces the number of vehicles that can be located within a designated parking/dispatch lot area. So, not only do these designs come with the additional costs associated with the material, construction, transportation, and maintenance of building enclosures, but they also take up additional land, thus worsening the economics (increased Capital Expenditures (CapEx) and Operational Expenditures (OpEx).

To reduce the utility demand requirements that large commercial EV charging sites pose, such as urban last-mile delivery van dispatch operations, on-site energy generation and storage are needed. Such localized energy assets must also not take up any additional costly and limited commercial real estate. A standardized renewable electricity generating and energy storage carport is needed to reduce construction and installation costs and time of sed localized energy assets. A system of this type that is manufactured quickly off-site and shipped to the site for rapid installation, reducing upstream power requirements from local electric suppliers, will catalyze economically viable (Levelized Cost of Energy plus Storage (LCOE+S)) by providing an "out of the box" EV fleet charging solutions.

An alternative to convection solar carport designs and building/housing EV charging structures is the portable "docking" design. These standardized designs check some of the requirement boxes but are missing one or two crucial capabilities. As described in U.S. Pat. No. 11,912,144B2 are "moveable docking pad transportable to an off-grid location with an access ramp for parking the electric vehicle on the docking pad." US20240149725A1 refers to their docking pad component as a "base plate." While these standardized, ship-to-site solar roof EV docking pad systems are of standardized design, manufactured off-site, and appear to require little to no site preparation work and construction, each known example is missing at least one crucial embodiment for the commercial EV fleet operators. For instance, the U.S. Pat. No. 11,912,144B2 and US20240149725A1 systems are for "off-grid" applications. While this may be great for remote areas where you cannot get a grid connection, but for EV charging operations in areas where there are existing electric utility distribution services, it lacks the ability to utilize a utility grid connection. Relying solely on the energy generated by the solar roof presents a problem when there isn't sufficient solar radiance to charge the intended vehicle. They also lack the ability to network and share energy resources, a crucial feature needed for businesses that require reliable on-demand electricity to charge their EVs.

The aforementioned docking designs rely on the mass (ballast) and surface area of their pad/base plate to counterbalance the solar roof system and provide stability. This unique system allows for drop-onsite installation instead without needing an inground foundation, but it ships with a lot of additional mass to solar generation capacity. Each additional solar panel added to the system to increase total electricity generating capacity equates to additional counterbalancing mass and/or ground pad surface area. This is a limiting factor, limiting the maximum size of the solar roof system and, thus, the total generating capacity of each docking carport.

For most EV fleet operations, solar production times don't match up with their EV charging times. The solar irradiance needed for solar electricity production starts at sunrise, slowly increases until it peaks mid-day, and then tapers off until it ends with the sunset. While last-mile services dispatch their EVs early in the morning, they stay out all day and return to the dispatch lot at the end of their workday, typically in the late afternoon or early evening. So, while solar electricity is being produced, most of an EV fleet is out working, thus not available to utilize any onsite solar-generated electricity. This production vs demand time-of-day mismatch is why solar by itself isn't a viable charging solution for EV fleet operators. Solar production needs to be paired with adequate energy storage to store the generated electricity during the day while fleets are out so they can utilize the onsite generated renewable energy to charge their EVs upon return. Additionally, when insufficient solar is available due to weather and/or short daylighted hours in winter, onsite energy storage can be used to take advantage of the time EVs are out working to slowly charge from the grid in an effort to ensure the fleet's evening, overnight, or instant charging needs don't exceed the grid's capacity. Thus reducing that fleet's demand burden on its electrical grid and ensuring enough charging capacity to meet their needs.

Utilizing onsite storage with a smart and adaptive grid-connected EV fleet management system that oversees the charging needs of the fleet's EVs as well as optimizes the onsite EV charging infrastructure gives fleet operators the energy asset flexibility to take advantage of lower electricity pricing times by purchasing and storing low priced electricity until the optimum time to utilize it. Thus reducing the fleet's energy costs and giving them greater control over a major operating expense: energy.

Traditional behind-the-meter energy storage solutions with adequate capacity for EV fleet daily charging requirements take up significant amounts of valuable and scarce commercial real estate. These large containerized modular energy storage systems require their own designated space (real estate) that can't be utilized for other business operations. For these reasons, combining sufficient solar production and energy storage capabilities into a single elegant EV charging asset that takes up little to no additional real estate than a standard EV-specific parking spot is crucial for on-site EV fleet energy operational needs.

SUMMARY OF THE INVENTION

The invention, or device, as presented in this patent and all variations of the presented invention, will be referred to for the nonexclusive purpose of this patent as the Solar+Storage Electric Vehicles Charging Carport (SSEVCC). This SSEVCC invention term aims to define and distinguish the presented novel all-in-one electricity networked (microgrid, VPP, other SSEVCCs, electrical utilities, etc.) solar electricity generator roof and integrated energy storage EV-charging carport system.

The SSEVCC represents most of the primary functions, features, embodiments, solutions, and operations of the invention. The novelty of this invention is that it embodies an all-in-one, self-contained, solar electricity generator roof system 103 with an energy storage system(s) 100, an energy management system(s) 105 that facilitate electric networking (with microgrid, VPP, other SSEVCCs, electrical utilities, etc.), and an EV charger(s) 104 for the primary purpose of providing EV and other mobile/transportation electrical equipment charging with the additional benefits of grid-integration (microgrid, VPP, and electrical utility network, etc.) and charging self-autonomy. The presented embodiments and all key components as defined in this patent are structural components, or attached to, or contained within the structures and the system's enclosures (casings/housings). Key electrical and electronic components are integrated and/or structurally secured to the system's mechanical support structures.

As such, the SSEVCC system design incorporates several features that enable EV fleet operators to have greater control over their energy supply, energy mix (sources), energy costs, and energy autonomy. By adding adequate electricity generation and storage assets with a single ship-to-site solution, EV fleet operators can achieve a meaningful level of grid independence. Allowing EV fleet operators to unburden their local grids and increase their energy resiliency, mitigate energy supply risks, and diversify their energy portfolio, essentially achieving a previously unviable level of energy self-reliance. The SSEVCC will provide increased EV charging electricity autonomy in a single elegant mass- and cross-market solution, solving significant grid supply and demand issues for electrical utilities and EV fleet operator customers.

While each SSEVCC system can operate as a stand-alone (island/off-grid) system, greater customer/operator utility is achieved when electrically connecting multiple SSEVCC units across a parking/dispatch lot. This unique out-of-the-box feature allows each SSEVCC to be a node in a parking lot-wide electric network that collaboratively distributes and stores onsite-produced renewable energy. By networking multiple SSEVCC systems, they can aggregate their solar production, energy storage, and energy supply into a smart distributed (per EV parking spot) power plant to provide robust and dynamic multi-vehicle charging for EV fleets. Additionally, when this larger energy asset collective is connected to the grid, it can provide grid support services. As an EV lot-sized Distributed Energy Resource (DER), the SSEVCC system is well-suited as a participating energy asset for electrical utility grids, microgrids, and VPPs, further increasing each SSEVCC's capitalized asset value proposition.

With an integrated grid-interactive DC-to-AC inverter (micro, string, etc.) and AC-to-DC converter/charger or hybrid inverter-charger, the SSEVCC can intelligently provide electricity to an electrical utility grid as well as draw electricity from an electrical utility grid based on real-time electricity market supply and demand conditions. Connecting SSEVCCs to smart grids allows EV fleet operators to pair their SSEVCC network with heterogeneous energy resources. Not only does this mitigate supply-associated demand-side risks for the fleet operator, but it also allows the fleet operator to provide auxiliary grid benefits such as controlled demand reduction, storing excess energy production, voltage and frequency smoothing and regulating, brownouts and blackouts mitigation, and black start services to other grid-connected renewables.

As part of a localized EV fleet company-owned VPP, SSEVCC systems can provide electricity to company buildings, other assets, and operations as part of a company-wide holistic energy plan, reducing net energy costs, cleaning their energy mix with carbon-free renewables, and mitigating energy supply risks.

The SSEVCC system design ensures adequate onsite renewable electricity generation for charging EVs with minimal grid dependency. Derisking their EV operations from the absence of available grid-supplied electricity due to blackouts, brownouts, upstream constraints, etc. This unique capability is achieved through adequate integrated energy storage 100 as part of their on-site electricity supply system. This ensures that fleet operations are not left without electricity when grid-supplied electricity is insufficient or nonexistent.

By pairing each EV in a fleet with an SSEVCC, one SSEVCC parking spot per EV in the fleet, fleet owners become their own energy companies. When EV fleet operators have greater control of their energy mix (source type and unit price), the electricity supply and demand dynamic becomes more elastic and diverse for all stakeholders.

The SSEVCC design principles are embodied in cost-reducing, manufacturing optimization, and ease of installation and setup to facilitate rapid and widespread adoption. This idea of rapid adoption starts with efficiency gains and cost savings achieved through an assembly line factory-built process that centralizes the skilled labor forces and allows for optimum assembly automation to produce a standardized solar electricity generation, electrical storage capacity, and electronic package. The SSEVCC coming off the assembly line is a ship-to-site assembly with minimal additional onsite work. This system standardization is intended to meet conventional last-mile and other transportation and logistics services EV fleet operations needs without costly bespoke customization, ensuring lower manufacturing, shipping, and installation costs while facilitating rapid market wide deployment. That said, the modularity of the energy storage 100 and electronics 105 will allow for customization, down- and upgrading, and hardware component updating to ensure that customers get the greatest amount of enduring utility from their SSEVCC investment.

To ensure our SSEVCC solution makes the maximum positive impact on EV fleet adoption rates and EV fleet operations, the SSEVCC solution's primary objective is to provide a compelling and competitive levelized cost of energy plus storage (LCOE+S) for this energy-demanding market. An aspect of the SSEVCC's design is to minimize manufacturing costs while ensuring maximum utility and consistent quality. The SSEVCC pre-fabrication design facilitates the use of standardized structural and electrical components and elements, allowing for most of the system's assembly and construction processes to take place in a controlled environment, such as assembly line manufacturing facilities. This assembly line manufacturing process will optimize the output of SSEVCC systems for faster and more affordable shipping along with quick and easy installation. Thus, bringing down total system costs (CapEx) and reducing Solar+Storage EV charging carport purchase-to-fully operational duration.

BRIEF DESCRIPTION OF THE DRAWINGS

Having thus described the invention in general terms, reference will now be made to the accompanying drawings, which are not necessarily drawn to scale or proportion. The components used in these figures are not necessarily actual brand, make, or model components that will be used in any particular SSEVCC model or variation. The component locations are not specific to any particular SSEVCC model or variation. The primary functions that each component within the SSEVCC performs should, for the most part, remain the same throughout most SSEVCC models, variations, and design iterations.

Figure 1:
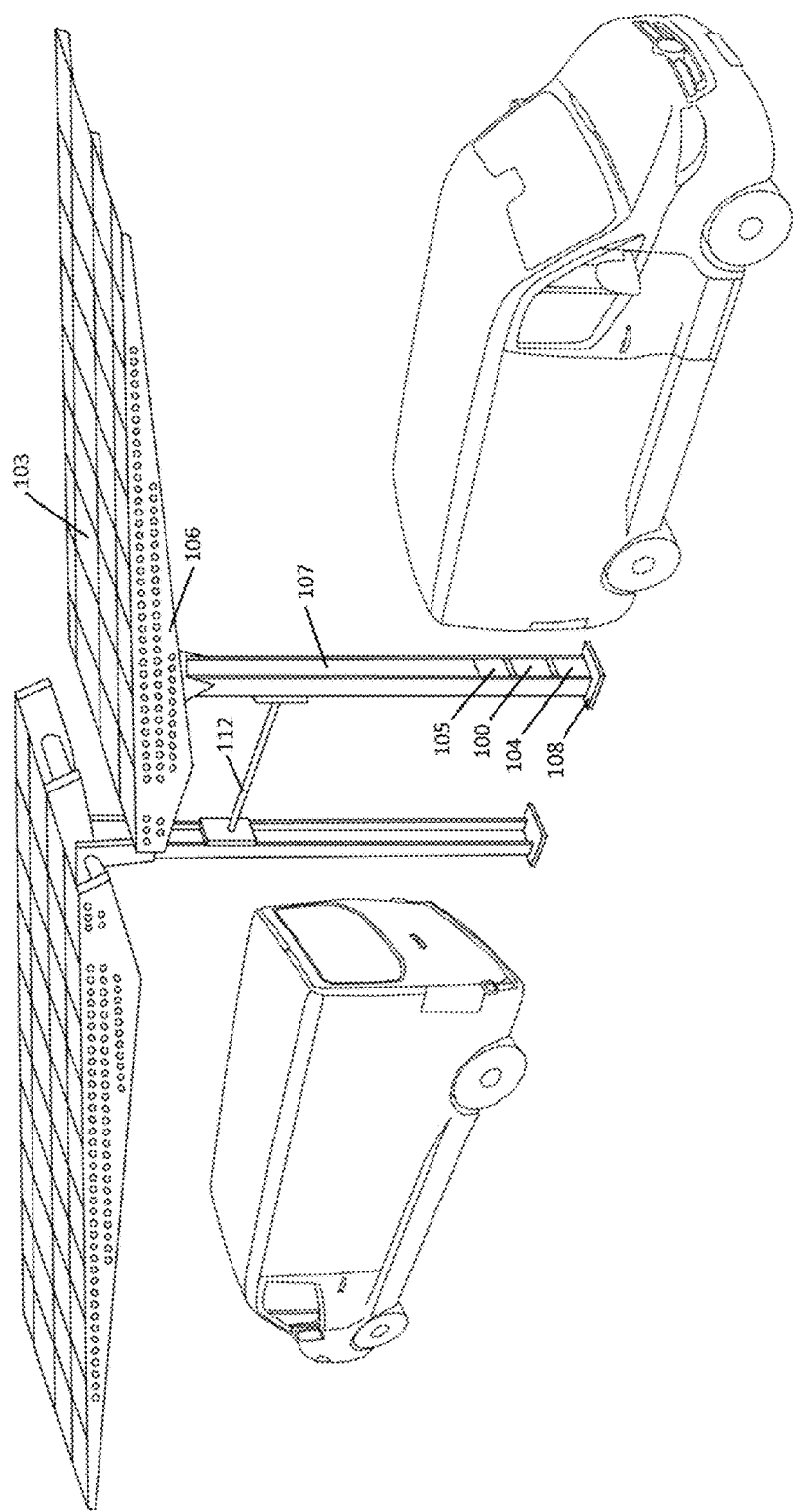

FIG. 1 is a perspective view of two SSEVCC single-carport systems installed with the backside of both SSEVCCs facing each other and connected via a tension guy wire with two EVs parked under their solar roof systems.

Figure 2:
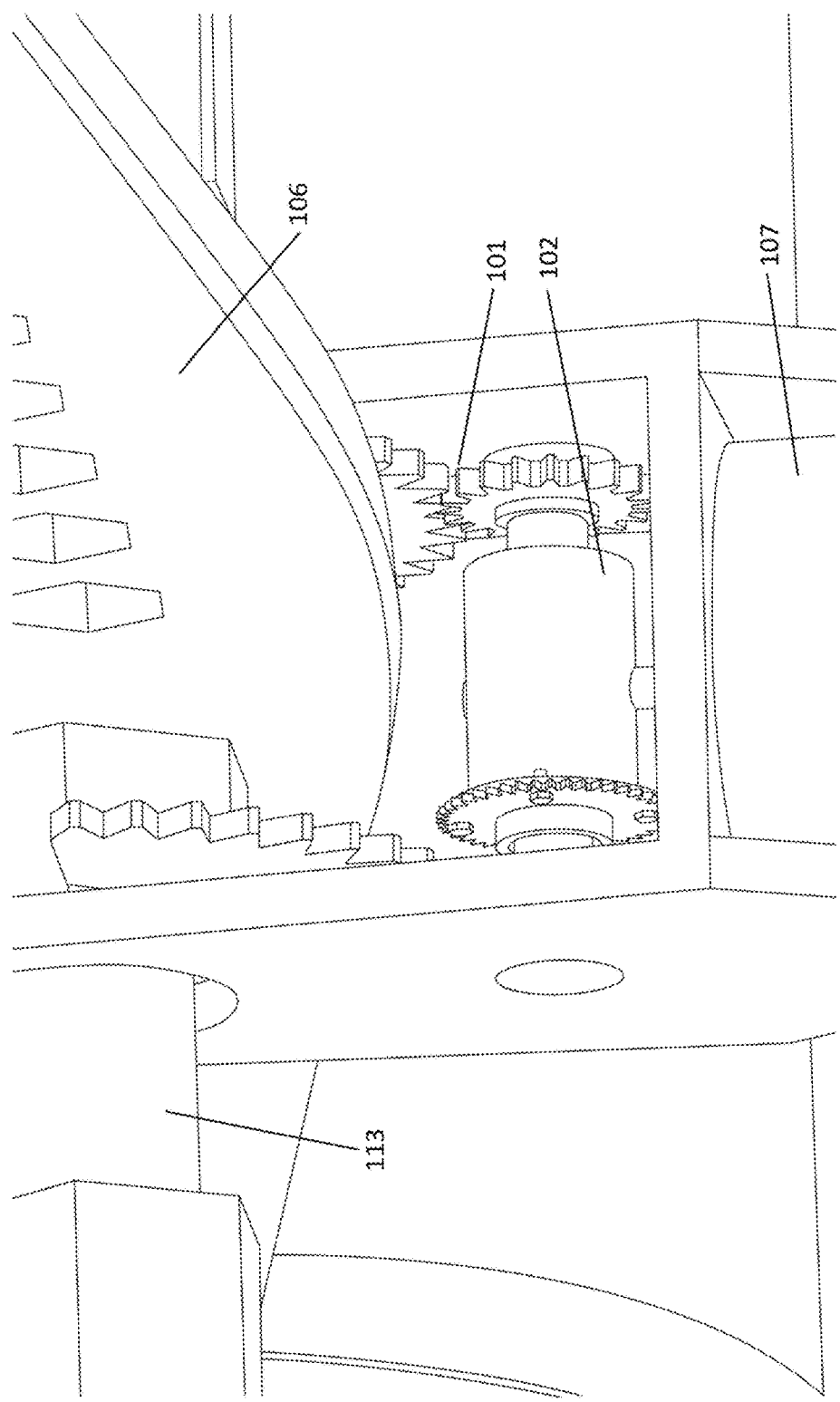

FIG. 2 shows a perspective view of an electric motor-driven mechanical roof tilt actuator system installed on top of a vertical support, between the vertical support and the roof.

Figure 3:
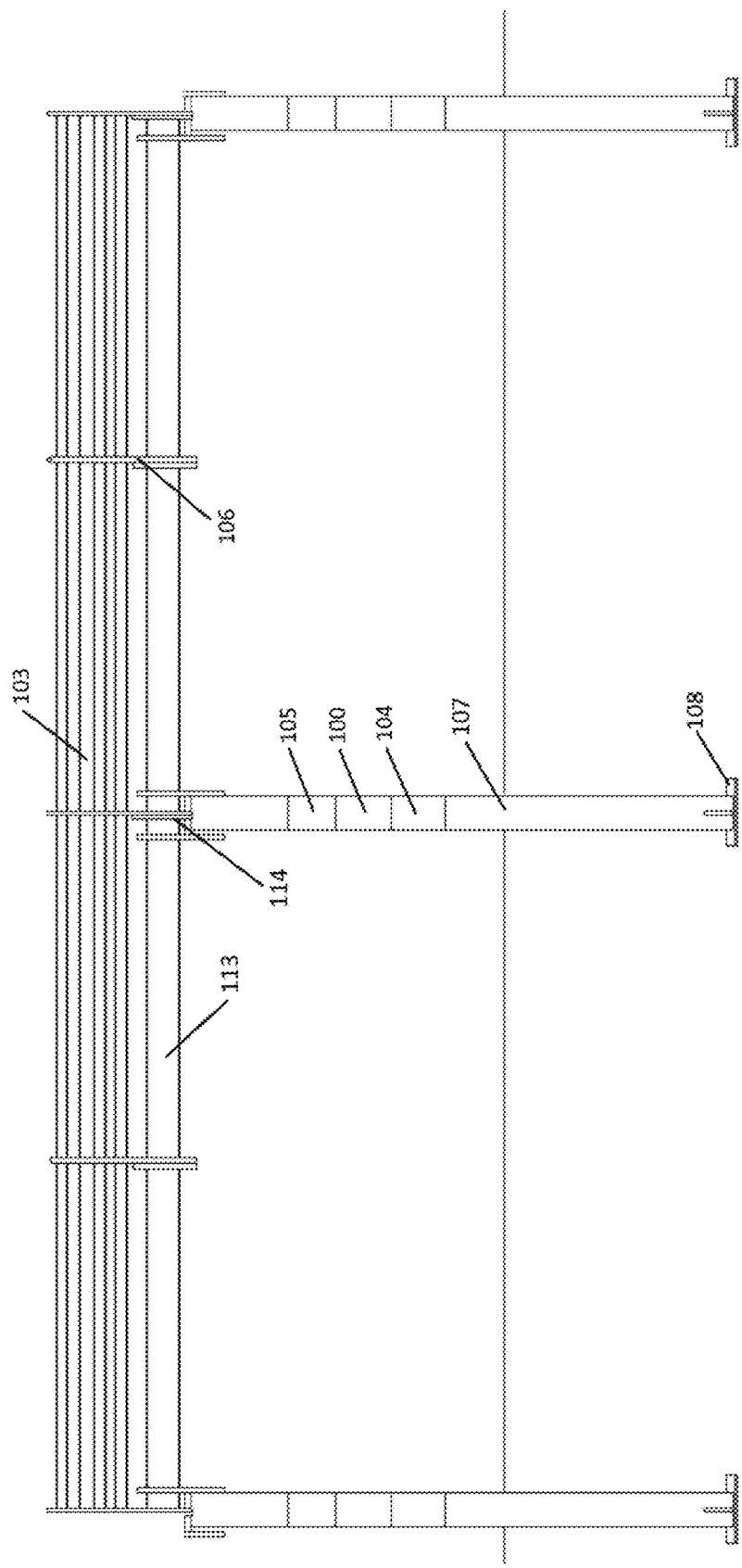

FIG. 3 shows perspective views of two SSEVCC two-carport systems installed side-by-side with a shared vertical support beam in the center where they connect to each other.

Figure 4:
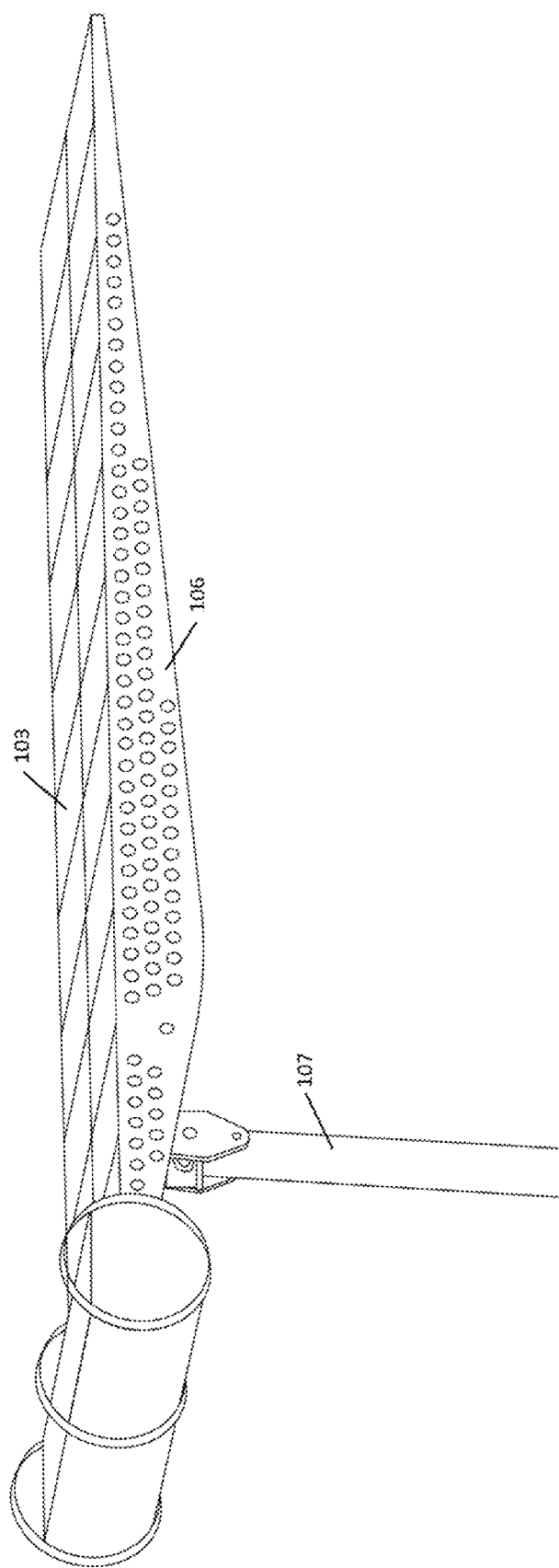

FIG. 4 is a perspective view of an SSEVCC single-carport system with a counterbalance weight system as the backside of the roof system.

Figure 5:
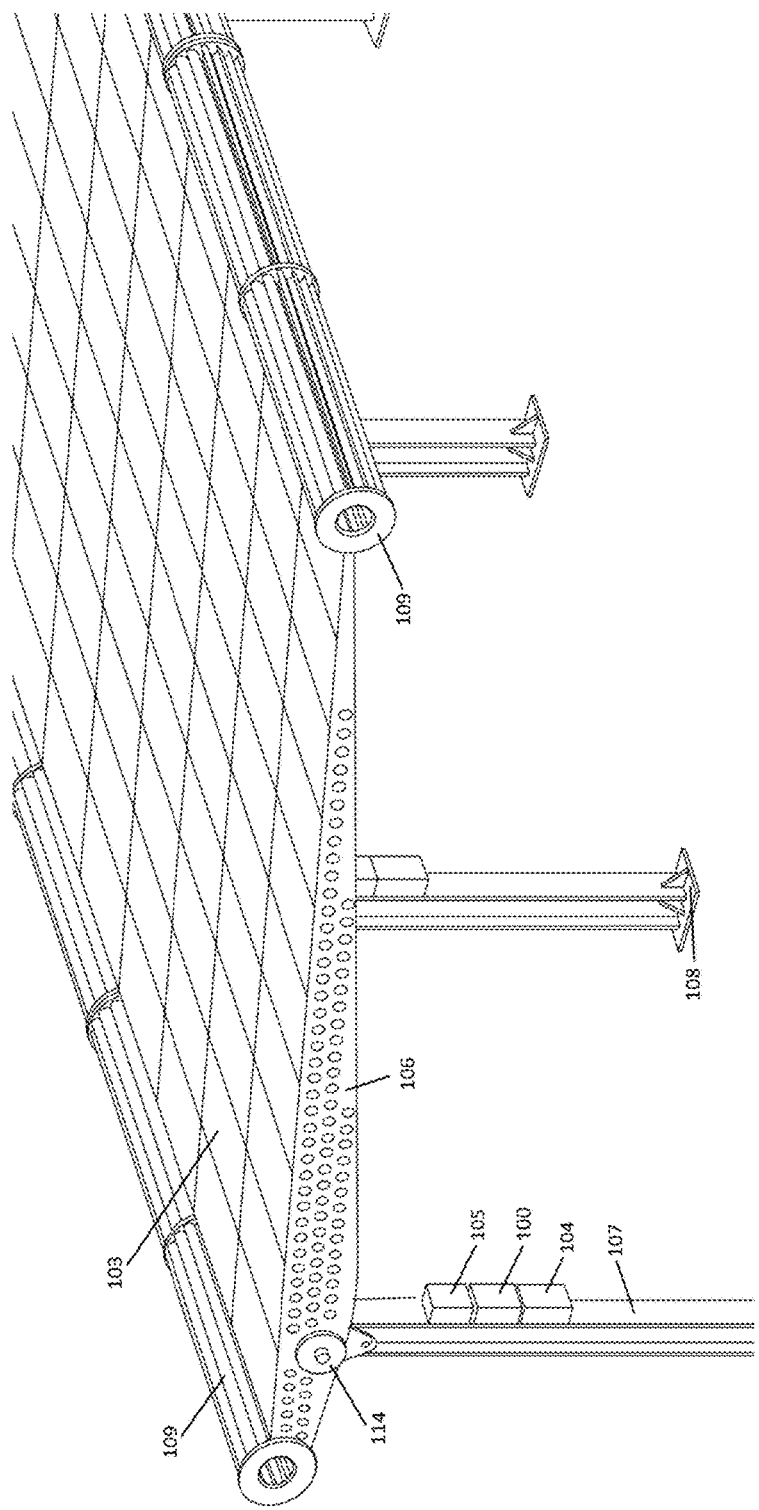

FIG. 5 shows perspective views of multiple SSEVCC two-carport systems installed side-by-side and connected via shared vertical support systems, with horizontal-oriented wind turbines installed on both the backsides and front sides of their roof systems.

Figure 6:
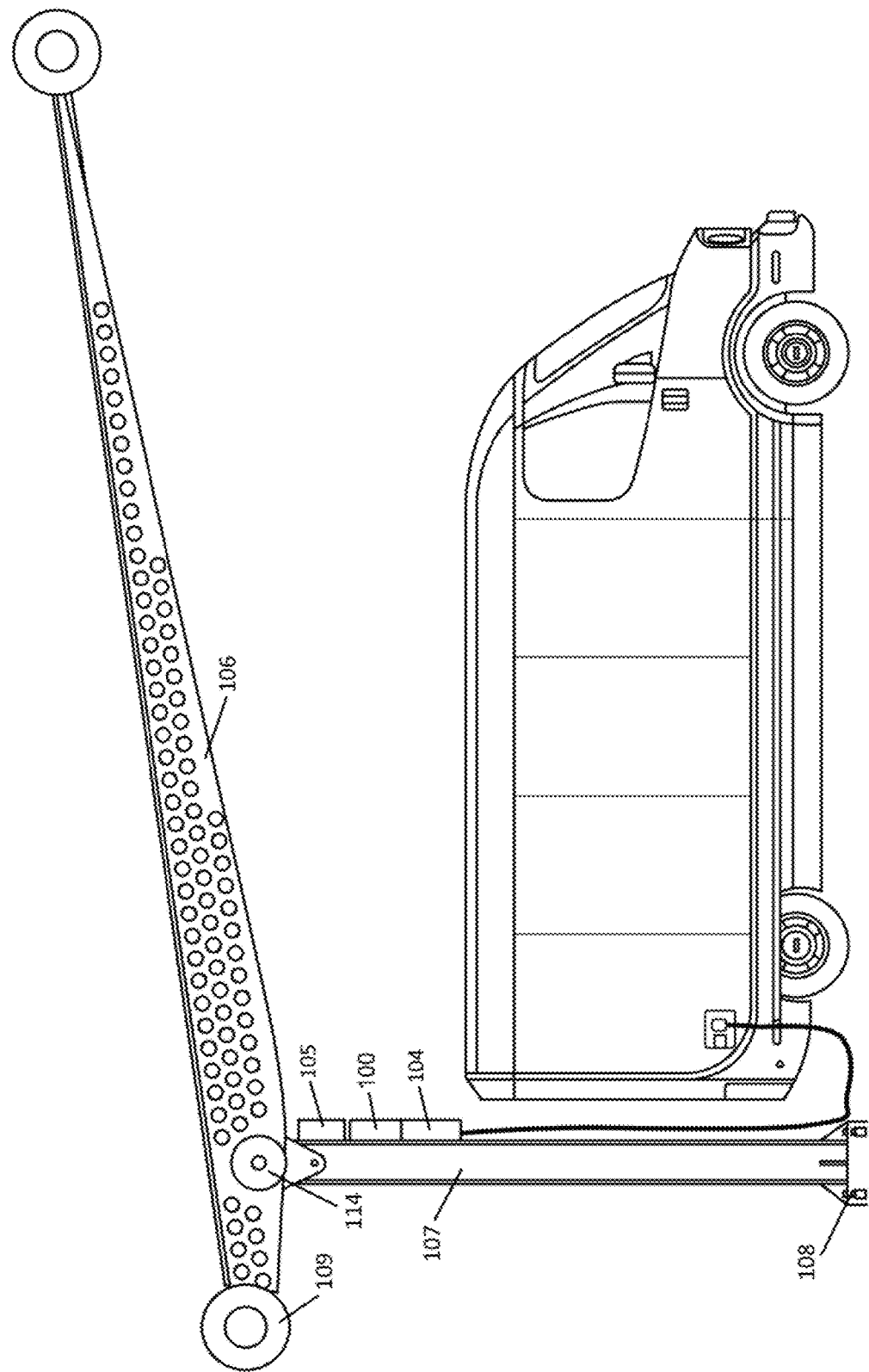

FIG. 6 is a perspective view of an SSEVCC with horizontal-oriented wind turbines and an EV charging via the EV charging system.

Figure 7:
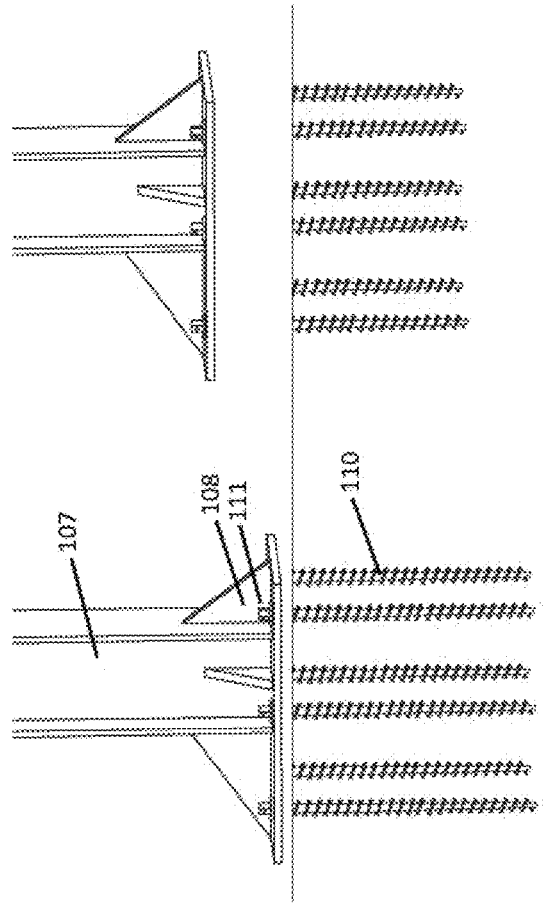

FIG. 7 shows perspective views of multiple SSEVCC ground-mounting systems utilizing ground screws to secure the SSEVCCs to the parking lot surface.

Figure 8:
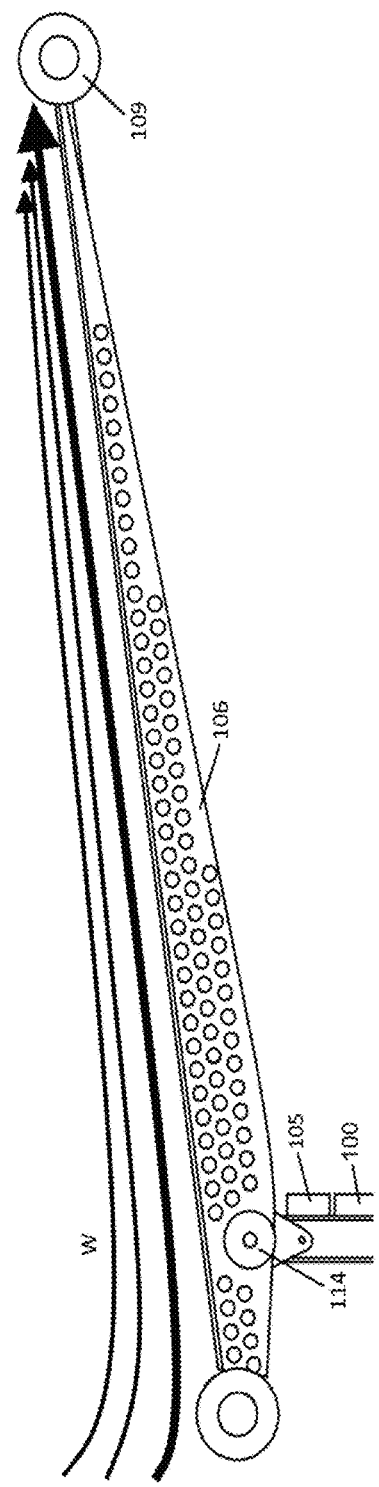

FIG. 8 is a perspective view of an SSEVCC with horizontal-oriented wind turbines, showing the potential wind steams consolidating (wind-concentrating) effect of the upper (above) angled/tilted roof surface.

Figure 9:
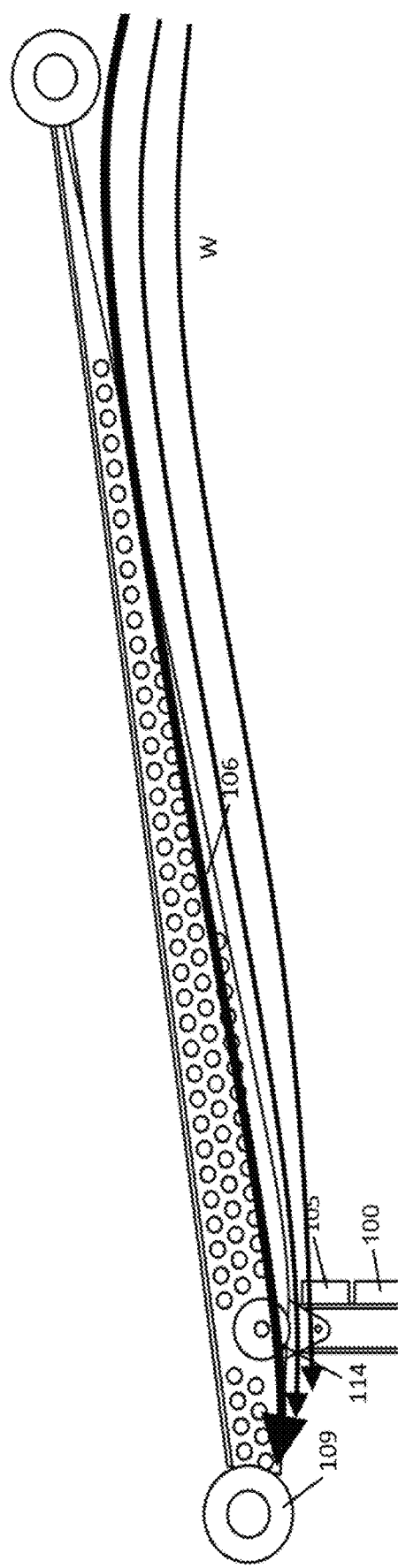

FIG. 9 is a perspective view of an SSEVCC with horizontal-oriented wind turbines, showing the potential wind steams consolidating (wind-concentrating) effect of the lower (under) angled/tilted roof surface.

DETAILED DESCRIPTION OF THE INVENTION

The invention will now be described more fully hereinafter through reference to various embodiments. These embodiments are provided so that this disclosure will be thorough and complete, and will convey the scope of the invention to those skilled in the art. Indeed, the invention may be embodied in many different forms and should not be construed as limited to the embodiments set forth herein; rather, these embodiments are provided so that this disclosure will satisfy applicable legal requirements.

As used in the specification and in the appended claims:
a. The SSEVCC may also be referred to as "the invention", "the system", or "the device";
b. The singular forms "a", "an", and "the", include plural referents ("one or more") unless the context clearly dictates otherwise; Such "one or more" meanings are most especially intended when references are made in conjunction with open-ended words such as "having," "comprising" or "including;"
c. The use of "and" and "or" does not explicitly mean in addition to or alternatively, but is implied to include both the additive and alternative forms of the term implemented in the text to enhance the readability of the document;
d. The use of "at least" and "one or more" implies that it is not limited to a singular;
e. The use of "to", "on", "in" or "through" a component or embodiment of the system implies the substitution of these prepositions. For example, "to" may also cover a "through" application;
f. "Via" encompasses on and through something, by means of, using, and utilizing;
g. An "electrical connection", "electrical power interface", and "output connection" includes Alternating Current (AC), Direct Current (DC), bidirectional, and unidirectional; whereas an intentional mechanical connection is made that allows electricity to flow, be transmitted, via the connection;
h. "Electrical wire" is one or more electrically conductive flexible/bendable fiber(s), strands(s), filament(s), or thread(s) designed to conduct electricity. As such "Electrical Wire" encompasses cord, cable, conduit, and rod.
i. A "distribution panel" is an intermediary device that connects two or more electrical connections, directs the flow of two or more electrical circuits, distributes electricity to/from two or more electrical devices/components, provides a mechanical electrical circuit disconnect, is a mechanical open/closed switch for at least one circuit, or diverts/routes electricity from at least one circuit to another circuit(s). As such, a "distribution panel" encompasses a distribution panel, a distribution box, a breaker panel, a breaker box, a fuse panel, a fuse box, a bus, a bus box, a busbar, a load panel, and a transfer switch.
j. "Load" is a demand circuit, and "source" is a supply circuit. Load and source circuits can be discrete or one and the same. A load circuit can also be referred to as an "output" circuit, and a supply circuit can also be referred to as an "input" circuit.
k. "Solar Panel" is a Photovoltaic device/system comprising of semiconductor cells where light (photons) is converted into electricity (electron flow) using the photovoltaic effect.
l. "Solar power management system" is a device/system or series of devices that monitors and regulates the voltage or amperage of the DC produced by solar panel(s)/cell(s). This device/system is also known as a DC-to-DC converter. They also provide reverse flow current protection to their solar panel(s)/cell(s). Examples of these devices/systems are maximum power point tracking controllers (MPPT) and pulse width modulation controllers (PWM). These devices may provide other electrical management services, i.e., energy storage solar charge controller, solar energy control for powering other SSEVCC systems, solar electricity feed to the EV charge controller, control the flow of solar electricity to connected SSEVCCs, and provide solar electricity to the grid via the grid-inverter system.
m. "Energy storage" is a device/system that stores energy, also known as an accumulator and a battery. These devices include chemical (including electro-chemical), electrical potential (static electricity or electrostatic charge), latent heat, radiation, and kinetic. The energy can be stored in or on liquid, gas, gel, solid, or phase change medium, form, substance, or substrate; and be contained and configured in a bank, pack, module, single cell, multi-cell, container, canister, or tank.
n. "Energy storage management" or "Battery Management System" (BMS), is a device/system that monitors the state of the energy storage. They can be connected to or integrated into an energy storage device. These systems may also provide energy storage system monitoring and protection services such as cell/pack balancing. It can also include or be integrated with various electronic components that may be used for thermal management, protection of the components, and the implementation of safety measures. These control electronics may include a battery management system (BMS), microcontrollers or other microcomputers, relays, and any other electrical or electromechanical components related to system controlling activities.
o. "Charging system" or "Charger" is a device/system that receives energy from an external source, converts/conforms it to the energy storage system(s), and supplies this energy input to the energy storage system(s). They can be AC-to-DC or DC-to-DC, and can be unidirectional or bidirectional.
p. "DC-to-AC inverter" is a device/system that converts a DC input into a conforming voltage, hertz, and phase (waveform) AC output. This device/system may invert to more than one phase (waveform). This system can be grid-tied (grid-forming/-conforming) or operate independently of the grid.
q. "AC-to-DC converter" is a device/system that changes AC into DC. AC-to-DC converters are also known as rectifiers.

r. "Hybrid inverter-charger" is a device/system that combines/incorporates the functions of a DC-to-AC inverter and an AC-to-DC converter into a single device. This device may also function as a DC-to-DC converter and/or a power supply.
s. "Data acquisition system" (DAQ) is a device/system that collects analog signals such as voltage, current, temperature, pressure, sound, etc., from other devices, systems, and sensors and converts the resulting samples into digital values to be used by computers for monitoring, controlling, etc.
t. Data "communication system" is a device/system (hardware and software/application) that allows for the exchange of data between two or more devices over a transmission medium/channel. Each device/system can include data transmission, digital transmission, and digital communication sub-devices/systems that transfer data over a point-to-point or point-to-multipoint communication channel. Examples of channels include wired connections like twisted pair cables, coaxial cables, fiber optics, storage media, computer buses, and wireless channels like radio waves, microwaves, and infrared signals.
u. "Passthrough" powering is where an external power source provides electrical current through an SSEVCC or an SSEVCC component/system without alteration, modification, inversion, or conversion to another SSEVCC or an SSEVCC component/system.
v. "Hybrid circuit" combines two or more electrical sources into a single output circuit.
w. "Autonomously" is an action or operation where the SSEVCC performs tasks, with or without human input or active supervision. Each action or operation is a function of the manufacturer's programmed or operator-specified parameters.
x. "Backfeeding" is the intentional and controlled flow of electricity in the opposite direction of its normal flow. In EV applications, this SSEVCC-to-Grid operation is commonly referred to as Vehicle-to-Grid (V2G) operations.
y. "Bolt" is a cylindrical bodied rod or pin used for fastening objects together. It typically comprises a bolt head at one end and along a portion of the length of its body and is secured by a nut. The nut is the female member of the pair, having internal threads to match those of the bolt. "Fastener" can be used in lieu of "bolt", as fasteners are hardware devices that mechanically join or affix two or more objects together.
z. "Distributed Energy Resources" or "DER" are decentralized devices that generate, store, or manage electricity and are typically connected to a Smart grid. A grid manager or automated management system can collect data from these devices and control their operations to suit the needs of the grid or the grid operators. These electricity devices are traditionally consumer/customer-owned, on-site, on the consumer side of the meter (behind the meter), and at or near the point of use.
aa. "Microgrid" is a group of interconnected loads and distributed energy resources that act as a single self-contained controllable entity. It can connect and disconnect from the grid to operate in grid-connected or island mode. Microgrids include a fixed set of resources within a limited geographical area or confined network boundary.
bb. "Virtual Power Plant" or "VPP" is a network of distributed energy resources (DERs) that work together as a single power plant. VPPs are loose aggregations of individual sources (assets) and loads (including microgrids) that can be remotely and automatically controlled. VPPs are grid-tied and can grow or shrink depending on real-time market conditions.
cc. A "Smart grid" or "Smart electric network" is an electricity network that uses digital technologies, sensors, and software/applications to better match the supply and demand of electricity in real-time while minimizing costs and maintaining the grid's stability and reliability. Smart grids can utilize two-way flows of electricity and information to balance and optimize the grid. Smart grids can utilize DERs to monitor and control downstream supply and demand.
dd. "Grid support services" are a collection of functions that maintain the stability and reliability of the electric power grid, such as: supply and demand balancing, voltage and frequency stabilizing, fluctuation response, etc.
ee. "Electric vehicle charger", "EV charging device," or "EV Charger", is an AC or DC power supply device/system (component assembly or cluster of component assemblies) that is explicitly designed to supply electrical power for charging/recharging batteries installed within an EV or battery backs/modules that are designed to be installed into EVs. This system can use a charging cord that is inserted into an EV charging port, or it can charge the EV wirelessly. This includes using a "wireless charging pad" transmitter and/or receiver that charges an EV through resonant electromagnetic induction. This process is also known as inductive charging, and it sends or receives current to or from an opposing receiver or transmitter installed on/in the vehicle without a physical connection with the vehicle.
ff. A "vertical support" is a structural component that elevates the roof structure(s) and solar panel(s) from the vehicle parking spot surface and fully or partially supports the mass and mechanical loads of the attached systems.
gg. A "ground-securing," "ground-mounting," or "ground-connecting" structure or component forms a physical connection between the vertical support structure and the ground. The ground connection can be via above-surface, in-surface, and below-surface components.
hh. A "structure" is a collection of elements that provide support or enclosure, while components are the separately attached parts of a structure.
ii. "Adjacent structure" can include: a building, another SSEVCC system, parking structures, bridges, trees, and rock structures.
jj. A "ground screw," also called an "earth anchor," "helical pile," and "hex anchor" is a threaded or augered (helical) bar, stake, shaft, or pole that is screwed or driven down into the ground/surface by hammering, screwing, or applied force-driving to the appropriate embedding depth and torque. It can be used to secure both above and below-ground structures.
kk. "Guy wire", also called "guyed wire", "guy cable", "guy strand", "guy-line", and "guy-rope" is a tensioned cable/wire designed to add stability to freestanding structures by attaching one end to a point on that structure and anchoring the opposing end to the ground or another structure. It limits/inhibits the movement of the supported structure through mechanical tension.

ll. "Pitch mechanism" and "tilt mechanism" are mechanical actuators, electromechanical motors, hydraulics, and pneumatics devices that can be used to increase or decrease the upwards/downward angle between the roof and its vertical axis support(s).

mm. "Tubercles" are airfoil leading-edge protuberance devices (bumps/humps) with uneven wave-like designs. They have been documented to help to improve the lift performance of the wind turbine blades. These devices create vortices that aid in boundary layer reattachment to reduce flow separation. They improve the lift performance (ratio of lift coefficient to drag coefficient) of airfoils and provide noise reduction.

nn. SSEVCC "component count" is the final installation and fully operational subcomponent count. This can be limited to singular primary components, sets of primary components, or the entire SSEVCC system. For example, if one SSEVC's final installation consisted of 100 subcomponents comprising the four primary structural components (roof structure, the crossbeam, the vertical support structure, and the ground-securing structure), then 51% of the total primary structural components count is any combination of 51 subcomponents that make up those four primary structural systems. "Total component count" can refer to a combination of components from different structural components (e.g. roof structure, the crossbeam, the vertical support structure, and the ground-securing structure) or different systems (e.g. solar panel or photovoltaic cell system, energy storage, solar power management system, energy storage management system).

Since there is no US-based company producing a standardized ship-to-site EV charging solar carport with integrated energy storage, unit-to-unit link ability, and grid-integration that secures to the ground with minimal surface intrusion, the SSEVCC concept integrates all these features into a single comprehensive design. To ensure the SSEVCC fits the business models (daily EV charging needs, operation risk mitigation, energy cost control, clean energy objectives, etc.) of a significant portion of today's and tomorrow's small to medium-duty work EV fleets, each SSEVCC system will include, at a minimum, the following components, systems, features, functions, and embodiments:

A roof comprises at least one solar panel (photovoltaic) 103 that generates renewable electricity from sunlight;

A roof support structure system 106 to mount/install the solar panel(s)/cell(s) to/in and support their mass and the environmental loads the roof will be subjected to (wind, snow, ice, rain, debris, etc.);

At least one vertical support structure 107 the roof directly or indirectly connects to, elevating and supporting the roof system (mass and induced loads);

A ground mounting system 108 to connect and secure the vertical support(s) and the SSEVCC as a whole to the ground;

Energy storage system 100 integrated on/into the vertical support, ground mounting system, or roof structure to store SSEVCC solar roof-generated electricity, as well as microgrid-, VPP-, utility-supplied electricity;

An energy storage charger, discharger, and management system(s) 105 to control the charging, discharging, safety, and health of the energy storage system;

AC and/or DC electrical connection(s) and wiring to link SSEVCCs together and facilitate the controlled transfer of electricity to, from, and through connected SSEV-CCs;

A system that facilitates power systems data collecting, reporting, controlling, and communication with other systems such as other SSEVCCs, fleet lot operators, centralized control system(s), etc.;

An EV charging control system (charger) 104 with an EV charger cable and connector, or an EV induction (wireless) charging system.

In addition to the aforementioned minimum SSEVCC components, systems, features, functions, and embodiments, an integrated wind turbine system 109 that uses wind energy to spin a rotor system, which is connected to a generator that creates electricity, can further increase the customer/user utility and value proposition of the SSEVCC. Our proposed wind turbine addition and how it utilizes the roof surface to concentrate wind flow is unique to this carport design.

Unlike U.S. Pat. No. 11,912,144B2, where a conventional horizontal-axis wind turbine (HAWT) is attached to an extended pole/tubing-like support structure that is secured to a platform, wherein the platform is the renewable energy source supporting structure connected to the vertical support column, the ideal wind turbine configuration for a non-A-frame (non-gable) carport roof system is a horizontally-oriented wind turbine 109 installed along (parallel with) the upper and/or lower roofline(s)/roof edge(s). This turbine system utilizes the surface area of an acute (downward) or obtuse (upward) sloped, tilted, or angled carport roof to concentrate and direct the wind flow up or down one or more roof surfaces into a horizontally-oriented wind turbine(s).

This synergetic wind turbine addition can comprise a Darrieus-type airfoil blades (lift) turbine and/or a Savonius-type turbine (drag force). The wind turbine system can also include additional airflow augmentation via guide nozzles, veins, defectors, and concentrators. These airflow augmentation devices may be integrated into turbine cowling(s).

This horizontal-oriented carport roof edge turbine configuration can take advantage of the natural wind-concentrating effect of the angled roof surface(s) to increase the volumetric flow rate and generate additional power from kinetic energy-rich wind. In doing so, this method utilizes the existing upper (FIG. 8) and/or lower (FIG. 9) carport roof surfaces to concentrate the wind, which can increase the potential generation capacity of the wind turbine, which can increase the capacity factor (Cf) and power coefficient (Cp) of the turbine system, and thus of the carport system. It accomplishes this by increasing the volumetric flow entering the turbine(s). When wind W is introduced to the flat upper surface (and/or below/undersurface) of the pitched roof, it travels up this upper surface (and/or down the lower/undersurface) of the roof, concentrating the feeder wind steams W which join the consolidation flow W at different points along the roof surface. The majority of this consolidated airflow is directed by the roof towards a wind turbine to be converted into electricity.

Not only can the wind concentration effect of the roof system produce increased volumetric flow, but as explained by Bernoulli's fluid dynamic principle, the pressure differential between the carport roof's two areas (above/upper surface and below/undersurface) separated by the roof structure can increase the airflow velocity on the side with the greatest wind W. Since airflow velocity has an exponential effect on working forces, the greater the velocity, the greater the amplified thrust working on the turbine and, thus, greater power (P).

Not only can these proposed wind turbine types take advantage of the rooftop and roof underside wind-collecting surface(s), but these surfaces can block the wind from interacting with returning blades, thus improving the differential drag and overall performance.

a. The SSEVCC system is designed with the following attributes in mind: Each fleet EV's individual average daily charging requirements can be satisfied by the system's generated and/or stored energy;
b. Ensure a significant amount of the EV charging energy can come from at least one clean and renewable source;
c. Provide EV operations greater control over their energy costs and energy sources mix;
d. Mitigate EV charging/operational risks associated with utility-provided electricity availability and reliability issues;
e. Provide EV operators with a per-EV charging solution that can expand with their fleet as it grows, where solar generating and storage capacities incrementally increase as each additional EV or sets of EVs are added to a fleet;
f. Reduce and mitigate the grid demand and burden each EV poses to their local electric network(s), especially during critical peak demand times.

SSEVCC Structure and Electrical Integration

The SSEVCC carport structure comprises at least one vertical supporting structure 107 attached to the ground or a ground-based structure 108, providing structural support and off-ground mounting and securing for the roof system 106, energy storage system 100, EV charging electronics 104, electrical control system 105, etc.; a roof system designed to provide at minimum partial shelter from above natural elements for at least one vehicle as well as a platform for solar panels.

The rooftop surface may comprise solely solar panels 103 that may be used as the only shelter from the natural elements (sun, rain, snow), therefore providing multi-utility and reducing the need for other roofing materials, such as a sub-roof.

Single-side solar panels (mono-facial) 103 are installed on the roof structure with their photovoltaic side face up. Dual-side solar panels (bifacial) that capture light from both sides may also be used.

Each row (or column) of solar panels (the collection of which make up the solar canopy) is built as a standalone pre-wired subassembly that can be bolted onto the "crossbeam" (i.e. transverse beam) of the carport and be wired to the necessary electrical equipment to charge energy storage devices and EVs. This allows for simple and rapid assembly/disassembly of the solar panel canopy at the factory floor and/or on-site location. Another benefit of this design is that it allows for a configuration of the final carport of a different size. If a different-sized carport is desired, the rows and/or columns of solar panels can be added or omitted, while the appropriate length vertical, horizontal, and crossbeam(s) would be installed to accommodate the appropriate number of solar panel assemblies. As a result, the same cross-sectional shape for all structural members/beams may be maintained for different solar capacity size variations.

The electricity storage modules 100 will be installed on, mounted to, or attached to SSVECC structure components which can support their mass. This can include the roof 106 structure, vertical supports 107, or ground mounting structures 108.

The majority of the structure and electrical elements will be above ground, with enough clearance on all sides to accommodate the intended vehicle type. The roof 106 will hang over (fully or partially) at least one vehicle parking spot with enough vertical clearance in all active use positions to accommodate the intended vehicle type.

Example Carport Structure Ground Attachment Methods and Foundation Systems

Ground screw fixture without poured concrete foundation. The structural ground connection method is achieved with little to no disturbance, modification, or excavation of the ground on which it is installed. This minimal ground and lot surface intrusive method can be accomplished by installing the SSEVCC system on top of existing parking space surfaces such as cement, concrete, rock, compacted/rammed earthed, or unimproved surface, and secured to the ground with at least one ground fixture (screw, helical pile, or hex anchor) 110 that is driving down through a "securing hole" (a.k.a. mounting hole) of the ground mounting system, embedding this ground penetrating hardware into the ground surface by hammering, screwing, or driving them to the appropriate depth and wherein the ground screw's protruding head overlaps the inner circumference/perimeter of ground mounting hole and provides the necessary mechanical forces to secures the SSEVCC to the ground. The high bearing area of the subsurface fixture provides the upward lift and lateral resistance securing forces to the fixture head 111, putting opposing downward force on the ground mounting system. The installed high-bearing area fixture(s), along with the weight of the system and the moment of its mass, applies the necessary downward force on the system's ground-securing surface(s)/footing(s) to create a stable structure in accordance with applicable local structural requirements.

Pre-installed fixtures foundation. This method is similar to the first method in that the ground mounting system is also installed on top of existing cement or concrete and secured to the ground with at least one pre-installed ground fixture (screw, helical pile, or hex anchor) 110. To provide the necessary load-bearing capacity, the ground fixture can be a screw, helical pile, or hex anchor, installed as mentioned in the previous method, where the top portion protrudes above the ground allowing the ground mounting system to be installed with the fixture's top threaded portion protruding through the ground mounting system securing hole (i.e. mounting hole) and facilitating the use of a securing nut 111 installed over the of the ground mounting system, overlaps the inner circumference/perimeter of ground mounting hole and provides the necessary mechanical forces to secures the SSEVCC to the ground. Another version of this method uses at least one pre-installed ground bolt fixture installed in at least one bored piling.

Pole-in-ground. In this method, at least one vertical hole is drilled/excavated into the ground, and a ship-to-site vertical support will be installed down into the earth. This vertical support/SSEVCC ground securing method takes its ques from conventional power/utility pole installation methods. The subsurface portion can use foundation material to reinforce and secure the pole, i.e. encasement in concrete or other forms of dense foundation materials.

Pre-manufactured and ship-to-site ground slab. In this method, a pre-manufactured foundation slab, with or without SSEVCC pre-installed structures or components, is shipped to the site and placed on the existing parking lot surface. This method relies on the slab's mass and surface contact area to secure the SSEVCC to the ground and support its mass and loads. Variants of this method have the slab partially or fully sunken into the ground. The slab can be constructed of concrete, metal, plastic, etc., or any combination of materials. The slab can be hollow to save on shipping weight and then filled with mass onsite with locally procured materials like sand, gravel, concrete, water, etc.

High-tension anchor wires/cable. The vertical structure of the SSEVCC can use guy wires (guyed wire, guy cable, guy strand, guy-line, guy-rope) 112 as a tensioned cable designed to add stability to our freestanding structure by ground anchoring the SSEVCC. These tension wire/cable systems 112 can also provide support between two or more SSEVCC units and support from other structures, such as adjacent buildings.

Any combination of the aforementioned methods can be used to achieve the desired installation.

SSEVCC Electrical Interconnection System

The structural support will incorporate the necessary feeder electrical wires, cables, and connections to transmit/distribute electricity to and from each SSEVCC unit. This system relies on the integrated Electrical Interconnection Systems (EIS) network formed by connecting each SSEVCC in rows and/or columns for external electricity supply and distribution as established by the fleet operator and/or electric utility company. The system's electrical wires, cables, and connections can be installed on and in each SSEVCC unit without the need for underground wires, cables, and connections between mechanically connected SSEVCCs. Having crucial wires/wiring above ground and secured within/on each SSEVCC in a row/column that allows for parking/charging/dispatch lot-wide electrical distribution/transmission without burying wires/cables will reduce the per unit and total lot installation and maintenance complexities and costs, facilitating expeditious installation, setup, operational readiness, and maintenance/repairs.

Primary electrical connections and wiring can be capable of bidirectional electricity flow, allowing for systematic electricity transfers to and from the integrated energy storage system(s) and shared external electric supplies and loads. This active (controlled) or passive bidirectional flow allows for electricity to flow between SSEVCCs as well as connected external sources (i.e. the grid, wind, and other generator sources) to charge the EV(s) and the electricity storage system(s) as needed. Each SSEVCC system, or select SSEVCCs in a network, can have an integrated inverter to produce grid-conforming Alternating Current (AC) to back-feed grids, power AC EV charger(s), and provide power to local buildings and other onsite assets/equipment.

Energy Storage Example Variations

In one variation, the energy storage system 100 is housed inside and mechanically connected to the vertical support structure. An example (FIG. 1) is a vertical support C- or H-column/I-beam where the inside space of the column, encased by the three inner surfaces, houses the energy storage and associated electronics.

In a similar variation (FIG. 5 & FIG. 6), the energy storage system is housed in a box(s) (container(s) or module(s)), which is mechanically attached to the vertical support structure.

In another variation, the energy storage is part of the roof system as a counterbalance. The energy storage mass can be installed on the opposing side of the vertical support fulcrum, used to oppose the mass of the roof structure that extends over the vehicle parking spot(s).

These energy storage variations are designed to either have their energy storage system(s) and electronics installed at the factory and shipped as an attached component of the structure or their energy storage system(s) and electronics connections prewired with attachment fixtures pre-installed at the factory for straightforward on-site plug-and-play installation with little to no additional configuration.

The electricity storage modules may incorporate a thermal insulation system to mitigate environmental and system-generated heat and cold from negatively affecting the energy storage cells. Further thermal protection may be incorporated with other passive (non-energy consuming phase-change materials, heat pipes, etc.) or active (liquid/gas cooling/heating loop, resistive heating, Peltier cooler/heater, thermoelectric heat pump, etc.) thermal management systems.

To increase system efficiency and reduce system complexity, the electricity storage modules may have parallel or series connection points for multiple electricity storage module pairing configurations.

The electricity storage modules may have an integrated electronic control circuit(s). These control circuits may monitor the state, status, and health of the energy storage cells, the power generation and management circuits, and the thermal management system(s) and perform monitoring functions for other connected systems (e.g., solar panels). The electricity storage module control circuit may be capable of storing and communicating this data to other devices and systems.

The electricity storage modules may be modular, allowing for adding and reducing total system storage capacities based on customer needs. Essentially, the energy storage modules could be electrically stackable in order to establish kWh increments allowing SSEVCC operators to add additional storage capacity installed on an SSEVCC. Additionally, the modularity of Energy storage will facilitate uncomplicated installation, removal, replacement, and maintenance of each module.

Solar Roof Pitch and Angle Control Design Variations

Roof pitch angles described are oriented in the general direction of north and south, with a pitched up, centered (zero), and pitched down setting(s). Roof tilt angles described are oriented from east to west, left tilt, centered (zero), and right tilt setting(s). These fixed or adjustable orientations facilitate optimum solar radiance coverage within the SSEVCC's design limitations. Each optimum solar coverage configuration and functionality (fixed, adjustable, or tracking) are based on installation location, system costs, and customers' desired capacity factor. The higher the solar generation capacity factor requirement, the greater the need for active pitch and tilt functionality and automation to make the desired degree changes in the desired time increments (real-time, minute, hour, day, week, month, or seasonal).

To achieve the desired orientation and level of adjustability, the SSEVCC can have the following solar orientation features and capabilities:

Fixed orientation with no built-in adjustability. The solar roof's fixed pitch and tilt are set to a standard design and cannot be further adjusted for location or seasonal solar generation/production optimization.

Fixed orientation set by the manufacturer per customer requirements. The SSEVCC manufacturer sets the solar roof's fixed pitch and tilt according to the installation location's latitude and the customer's preferred seasonal and/or annual solar generation/production.

Installation orientation adjustment. The SSEVCC ships to site with non-active mechanical adjusting mechanism(s), and the installer is provided a method(s) of adjusting the roof pitch and/or tilt during installation to the customer's preferred orientation(s).

Manual single-axis pitch control. The SSEVCC ships to site with non-active mechanical adjusting mechanism(s), which fleet lot operators can use to manually adjust the roof pitch at their discretion.

Manual two-axis pitch and tilt control. The SSEVCC ships to site with non-active mechanical adjusting mechanism(s), which fleet lot operators can manually adjust the pitch and tilt of the roof at their discretion.

Automated single-axis pitch or tilt. The SSEVCC ships to site with an active roof angle mechanical adjusting mechanism(s) 101 & 102, with control system, that can change/adjust the roof's pitch or tilt angle per the customer's desired solar production.

Automated dual-axis pitch and tilt control. The SSEVCC ships to site with an active roof angle or solar panel pitch and tilt mechanical adjusting mechanism(s), with control system, to change/adjust the roof pitch and tilt angle per the customer's desired solar production.

Fixed roof where tilt and pitch methods are applied to just the solar panels. The SSEVCC ships to site with a fixed roof and the solar panel(s) pitch and/or tilt angles are adjusted to produce the customer's desired solar production. This can be controlled onsite manually or automated, as described in previous pitch and tilt methods.

The solar roof and solar panel pitch and tilt angle adjustments mechanical adjusting mechanisms can be mechanical actuators 101, electromechanical motors 102, hydraulics, pneumatics, etc.

The solar roof and solar panel pitch and tilt angle adjustments can be autonomously adjusted per an SSEVCC controller or controlled by a lot-wide/system-wide automated master control system/program/application.

The solar roof can utilize a counterweight(s) to counterbalance/offset the roof's forward overhang mass (over the parking spot). This counterweight will partially or wholly offset the roof's primary extension from the vertical support structures over the vehicle parking space(s). This counterweight can include energy storage, water-/sand-/concrete-filled barrel(s)/container(s), formed concrete, etc. Placing this counterbalance mass on the side opposing the vertical support(s) will bring the roof's moment closer to or over the fulcrum, providing balance and stability, helping to maintain equilibrium, and minimizing structural vibration.

Example SSEVCC Installation and Mechanical Interconnection Methods

For this design variation as described, when the pre-assembled SSEVCC subassemblies are shipped to the customer's dispatch/operations lot on standard-sized semi-trailer(s), there will already be preinstalled attachment points for each carport at each parking spot. In this version, the SSEVCC utilizes two vertical support columns (FIG. 3 & FIG. 5) that attach to their ground attachment points on both sides of a single parking spot or a set of parking spots (multiple). After these vertical support columns are securely attached to the ground attachment point, the roof support crossbeam (transverse beam) 113 will be installed between the two vertical columns, connecting the vertical columns and providing the main horizontal support for the solar roof. This crossbeam pipe 113 can be utilized as the above-ground conduit for electric and electronic wiring/cabling.

To reduce the number of vertical support columns 107 needed across a row/column of interconnected (a.k.a. interlinked) SSEVCCs, each roof system can share vertical support columns 107 with their neighboring SSEVCCs (FIG. 3). As shown in FIG. 3, this shared vertical support column concept, wherein the right-side vertical support of one SSEVCC is connected via that SSEVCC's crossbeam (transverse beam) 113 to a left-side vertical support, wherein that vertical support is the neighboring SSEVCC's right-side vertical support which is connected via that SSEVCC's crossbeam to its separate left-side vertical support. The mechanical connections between SSEVCCs can be crossbeam-to-crossbeam or crossbeam-to-shared vertical support utilizing a mechanical joint(s) (i.e. bolted joint, coupler, flange, etc.). This FIG. 3 example represents a two SSEVCC and three vertical support beam configuration. This shared vertical support configuration can continue down the row/column for as long as there is no break/gap between two neighboring SSEVCC units.

In this extended system configuration, when SSEVCCs ship from the factory, each one ships with only a single vertical support structure. This reduces the total number of vertical supports needed for an uninterrupted interconnected/interlinked row/column of SSEVCC by nearly 50% compared to each SSEVCC utilizing two solely dedicated vertical supports. The exception is when a single SSEVCC is a single standalone with no connecting neighboring SSEVCCs. Standalone SSEVCC of this configuration will need to ship with two vertical support side columns. As shown in FIG. 1 & FIG. 4, centered single-column configurations are possible.

Once the vertical supports 107 and the crossbeam 113 are installed, the fully or partially assembled ship-to-site roof system will be hoisted into place and installed, utilizing the crossbeam(s) as the roof system's connection to the rest of the structure.

The relationship and cooperation between the elements presented in the SSEVCC, includes a minimally intrusive ground mounting system (FIG. 7), a vertical support system 107, a solar electric generator roof system 103, an energy storage 100 and management system, an EV charging system (charger) 104, an above ground electric distribution/transmission conduit system 113, a direct or indirect electrical grid connection capability, contrasts with the other previously known designs (US20130127395A1, US20090050194A1, US20110221203A1, U.S. Pat. Nos. 5,315,227A, 11,912,144B2, US20240149725A1)

Further contrasts are established with the options that include an SSEVCC-to-SSEVCC mechanically linking system(s) 114, an SSEVCC-to-SSEVCC electrical linking system(s), and an integrated horizontal-oriented wind turbine system 109 that may utilize the roof to increase volumetric airflow into the turbine(s).

In the most preferred embodiments, all of these elements benefit from each other's presence, and when combined together, the SSEVCC system's value proposition increases and economics are improved greater than that of which they would create individually or separately. In other words, the effect of the plurality of elements together is greater than the sum of the plural elements individually. This synergistic effect creates additional value to the system's customers and operators.

Thus, the Applicant has conceived of certain novel designs for renewable energy generating and storage EV charging carport, has furthermore taken multiple concepts, tools and information from a number of different fields, and has employed and/or combined them in a novel manner to design the SSEVCC system that exhibits a significant improvement for all stakeholders. The synergistic interaction of multiple components that embody this novel SSEVCC system has been strategically incorporated to ensure maximum energy generation and optimum energy management is employed onsite for EV fleet operators. The "Novelty of Design Process" is evident in the attention to the design details incorporated in the presented invention, resulting in the first mass-deployable SSEVCC system. The SSEVCC system features permit it to be usefully employed in many EV fleet markets and applications that prior systems are not adequate for.

The design of this SSEVCC system and/or components is unique because no other design up until the present has novelly combined (in component selection, component design and interaction of these components together) mechanical and electrical systems with assembly, transportation, and installation processes to maximize the value proposition of the present invention. Although some of the individual elements and certain combinations of these elements are known, the effects of all the different elements used in this design, especially the mutually beneficial and synergistic effects of these elements combined together, are new and inventive. As stated in this design, each element is initially incorporated and then optimized for EV fleet onsite energy production and management, therefore resulting in significantly improved energy diversification and risk mitigation for business and governmental entities who own and/or operate EVs.

The invention claimed is:

1. A Solar+Storage Electric Vehicle Charging Carport (SSEVCC) system, comprising:
    a) a roof structure that fully or partially covers at least one vehicle parking spot;
    b) the roof structure includes an upper roof edge, a lower roof edge, an upper roof surface, and a lower roof surface;
    c) at least one photovoltaic solar panel or photovoltaic cell system:
        i) installed on top of the upper or lower roof surface,
        ii) integrated into the upper or lower roof surface, or
        iii) comprising the upper or lower roof surface;
    d) at least one crossbeam, wherein the crossbeam includes at least one end;
    e) at least one vertical support structure, wherein the structure includes mechanical properties to withstand forces and deformations, effectively supporting the roof structure and withstanding reasonable environmental and operational forces and loads;
    f) at least one ground-securing structure that provides a ground contact area and attachment points necessary for securing, supporting, and stabilizing a mass of the SSEVCC system on, to, or in a designated vehicle parking area;
    g) at least one energy storage device installed on or to a mechanical support structure, or within a second component that is attached to a mechanical support structure, for storing electricity to charge an electric vehicle (EV);
    h) at least one solar power management system;
    i) at least one energy storage management system;
    j) at least one electrical connector for an electrical connection with at least one of the following external electricity supply systems or electricity demand systems:
        i) a second SSEVCC,
        ii) a Distributed Energy Resources (DER),
        iii) a Microgrid,
        iv) a Virtual Power Plant (VPP),
        v) an electric utility or power company distribution grid, or
        vi) an electrical network; and
    k) at least one horizontal-oriented Darrieus-style or Savonius-style wind turbine system installed along the upper or lower roof edges, wherein:
        i) each of the upper and lower roof edges is defined by a termination of the upper roof surface at angled transition sections that separate the upper roof surface and its opposing undersurface,
        ii) the wind turbine system includes wind turbine blades,
        iii) the wind turbine system does not cover the upper roof surface, to enable maximum solar panel or photovoltaic cell system roof surface utilization,
        iv) the roof structure does not include an A-frame, double-pitched, or gabled roof apex or ridge,
        v) enabling the SSEVCC system to take advantage of wind-collecting and concentrating effects of the roof surfaces to generate electricity from kinetic wind energy.

2. The system of claim 1, further comprising: at least one grid-interactive Direct Current (DC) to Alternating Current (AC) inverter.

3. The system of claim 1, further comprising: at least one AC/DC hybrid inverter-charger.

4. The system of claim 1, further comprising: at least one AC management system able to connect to at least one of:
    a) a second SSEVCC,
    b) a DER,
    c) a microgrid,
    d) a VPP,
    e) an electric utility or power company distribution grid, or
    f) an electrical network.

5. The system of claim 1, further comprising: at least one AC to DC converter.

6. The system of claim 1, further comprising: at least one DC to DC converter.

7. The system of claim 1, further comprising: at least one DC management system that can connect to at least one of:
    a) a second SSEVCC,
    b) a DER,
    c) a microgrid,
    d) a VPP,
    e) an electric utility or power company distribution grid, or
    f) an electrical network.

8. The system of claim 1, further comprising: at least one EV Charger system configured to:
    a) utilize a charging cord inserted into an EV's charging port; or
    b) utilize a wireless charging pad that wirelessly transmits electricity to a charging receiver of an EV.

9. The system of claim 8, wherein the EV charger system has an AC or DC back feeding capability that allows the SSEVCC system to receive electricity from an EV.

10. The system of claim 1, further comprising: at least one data acquisition system (DAQ) or data communication system.

11. The system of claim 1, further comprising: at least one solar roof angle adjustment movement mechanism.

12. The system of claim 1, wherein an electrical connection is made to at least one of:
    a) a second SSEVCC,
    b) a microgrid,
    c) a VPP, or
    d) an electric utility or power company distribution grid.

13. A method of electrically networking the SSEVCC system, as recited in claim 1, to one or more other SSEVCC systems, to aggregate electrical capacities and create an onsite smart distributed power plant to provide robust and dynamic multi-vehicle electric vehicle fleet charging, the method comprising:
   a) electrically connecting each SSEVCC system to at least one electric cable or line running between SSEVCCs via incorporated electrical interconnection and distribution components.

14. A method of electrically connecting the SSEVCC system, as recited in claim 1, the method comprising: electrically connecting at least one SSEVCC to at least one of:
   a) a microgrid,
   b) a VPP,
   c) an electric utility or power company distribution grid, or
   d) an electrical network;
   wherein the electrical connection is made using at least one of: an electric feeder meter, a distribution box, a transformer, or a substation.

15. A system for achieving adaptive power flow control between:
   a) the SSEVCC system, as recited in claim 1, and at least one other SSEVCC system,
   b) other connected DERs, or
   c) an electric utility or power company distribution grid; and
   wherein the system utilizes power control software to respond to changing power requirements of electric systems, balance an electric network, or provide electric grid support services.

16. The system of claim 1, wherein a mechanical connection is established between the SSEVCC system and one or more other SSEVCCs.

17. A method of interconnecting the SSEVCC system, as recited in claim 1, to one or more other SSEVCC systems, the method comprising: operatively connecting an end of a crossbeam of the SSEVCC system to an end of a crossbeam of a second SSEVCC system, or operatively connecting a crossbeam of the SSEVCC system and a crossbeam of a second SSEVCC system to at least one shared vertical support structure.

18. A method of securing the SSEVCC system, as recited in claim 1, to the ground, the method comprising: driving down at least one ground screw through an SSEVCC ground securing hole and embedding into the ground, wherein the ground screw's protruding head overlaps the inner circumference of ground mounting hole and provides the mechanical force that secures the SSEVCC to the ground.

19. A method of securing the SSEVCC system, as recited in claim 1, to the ground, the method comprising: installing the SSEVCC ground-securing component over top of at least one bolt that is installed into the ground prior to SSEVCC installation, wherein a threaded portion of the bolt passes through an SSEVCC ground securing hole, a securing nut is installed onto the ground bolt's protruding threads, and the securing nut overlaps the inner circumference of ground mounting hole, and provides the mechanical force that secures the SSEVCC system to the ground.

20. A method of securing the SSEVCC system, as recited in claim 1, to the ground, the method comprising: excavating at least one vertical hole into the ground and installing a ship-to-site SSEVCC vertical support down into the vertical hole.

21. A method of securing the SSEVCC system, as recited in claim 1, to the ground, the method comprising:
   a) shipping at least one pre-manufactured solid or hollow slab foundation to the site; and
   b) placing the slab foundation into an excavated hole, or installing on top of an existing surface, wherein the slab foundation secures the SSEVCC to the ground.

22. A method of securing the SSEVCC system, as recited in claim 1, the method comprising: utilizing at least one tension guy wire installed to the SSEVCC system, wherein it is utilized as anchoring support to the ground or an adjacent structure.

23. A method of counterbalancing the overhanging roof structure of the SSEVCC system, as recited in claim 1, the method comprising:
   a) installing a counterbalance mass to offset the overhanging weight;
   b) reducing the net moment; and
   c) bringing a greater amount of the system's mass over the vertical support structure's center of gravity.

24. The system of claim 1, wherein at least 51%, by total component count or total mass, of the combination of:
   a) the roof structure,
   b) the vertical support structure,
   c) the ground-securing structure, and
   d) the crossbeam,
      are assembled at a manufacturing facility and then transported to an installation site.

25. The system of claim 1, wherein at least 51%, by total component count or total mass, of the combination of:
   a) the solar panel or photovoltaic cell system,
   b) the energy storage,
   c) the solar power management system, and
   d) the energy storage management system,
      are assembled and connected to the SSEVCC system at a manufacturing facility and then transported to an installation site.

26. The system of claim 1, wherein at least 51% of the SSEVCC system is shipped together in the same shipment from a single off-installation site or facility to an installation site.

27. The system of claim 1, wherein airfoil leading-edge tubercles are used to improve the lift performance of the wind turbine blades or reduce the acoustic signature of the wind turbine system.

28. A method of generating electricity with the SSEVCC system, as recited in claim 1, the method comprising: utilizing the surface area of an acute downward or obtuse upward, angled carport roof, to concentrate and direct wind flow on one or more roof surfaces into the wind turbine system.

* * * * *